UNITED STATES PATENT OFFICE.

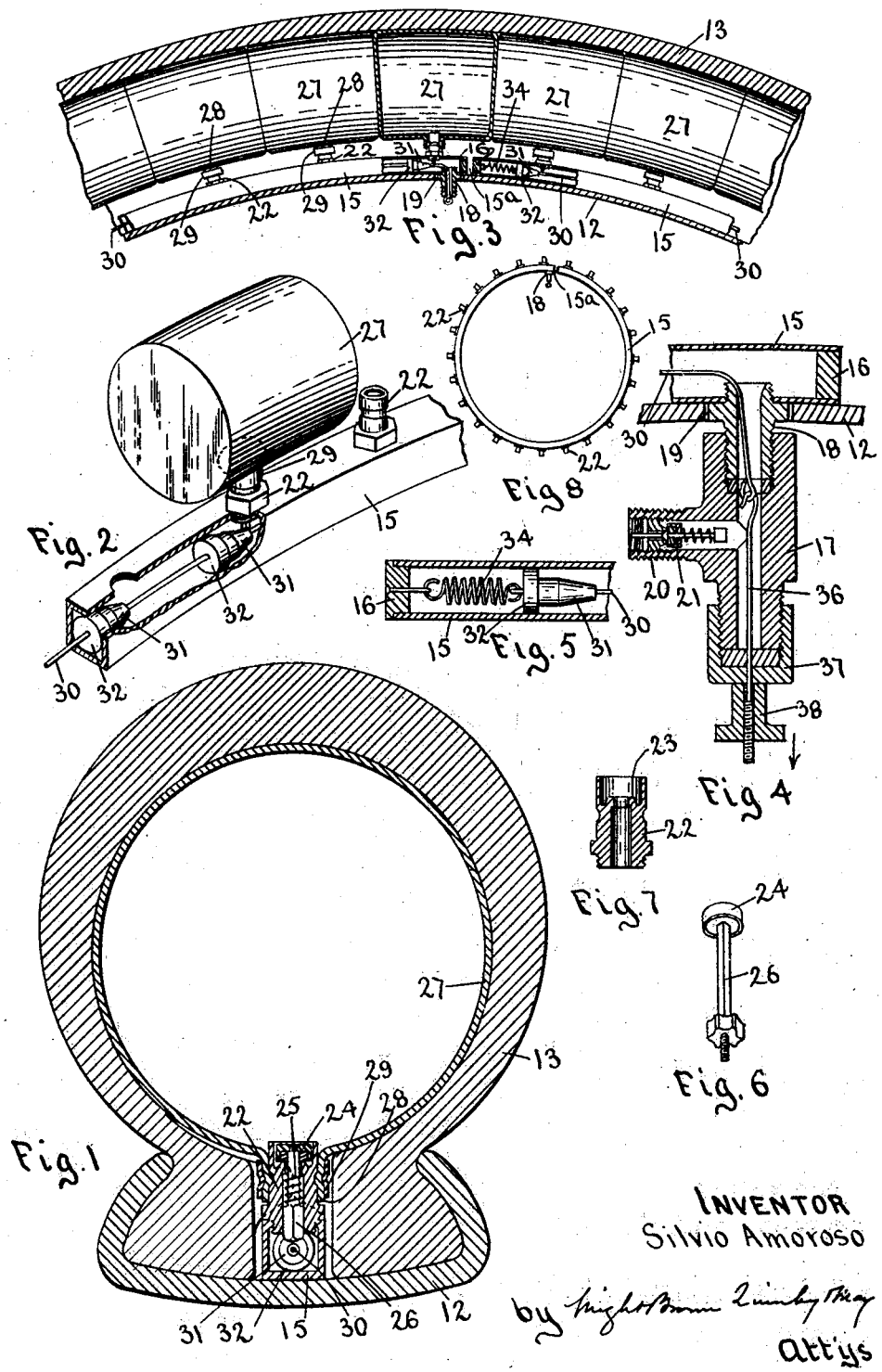

SILVIO AMOROSO, OF BOSTON, MASSACHUSETTS, ASSIGNOR OF ONE-HALF TO ALEXANDER FRISCH, OF WINTHROP, MASSACHUSETTS.

PNEUMATIC ELEMENT FOR VEHICLE WHEELS.

1,406,324.

Specification of Letters Patent. Patented Feb. 14, 1922.

Application filed March 21, 1921. Serial No. 454,051.

*To all whom it may concern:*

Be it known that I, SILVIO AMOROSO, a citizen of the United States, residing at Boston, in the county of Suffolk and State of Massachusetts, have invented new and useful Improvements in Pneumatic Elements for Vehicle Wheels, of which the following is a specification.

This invention relates to a pneumatic tired wheel which includes an annular wheel rim and a hollow flexible tire shoe or carcass, formed to receive the usual inflatable inner tube, and having base portions seated on the rim, the said base portions and rim having any suitable formation permitting the separation of the shoe from the rim when the inner tube is deflated.

The invention is embodied in the improvements hereinafter described and claimed.

Of the accompanying drawings forming a part of this specification,—

Figure 1 is a cross sectional view of a wheel rim and a tire shoe, and of an attachment embodying the invention associated with the rim and shoe.

Figure 2 is a fragmentary perspective sectional view, showing a portion of the air conduit, one of the inflatable bags, and a portion of the controller, the conduit being partially broken away.

Figure 3 is a fragmentary view, showing parts of the wheel rim and tire shoe in longitudinal section, one of the bags in section, and others in elevation, portions of the air conduit in elevation, and other portions in section, and portions of the controller, the inflating valve being omitted.

Figure 4 is an enlargement of a portion of Figure 3, showing the inflating valve in section.

Figure 5 is an enlargement of a portion of Figure 3.

Figure 6 is a perspective view, showing a modified construction of one of the nipple valves and its stem.

Figure 7 is a sectional view of one of the nipples detached from the conduit and from the bag.

Figure 8 is a side view of the air conduit on a reduced scale.

The same reference characters indicate the same parts in all of the figures.

The rim 12 and tire shoe or carcass 13 of a wheel to which my improved attachment is applicable, may be of any usual or suitable construction, providing base portions on the shoe interengaged with flange portions or ears on the rim, and providing an exposed portion on the rim between the base portions of the shoe, said base portions being suitably separated from each other, and the arrangement being such that the air conduit hereinafter described may bear separably on the rim between the base portions of the tire, and the nipples and the bag necks may be interposed between said base portions. The rim may be an inseparable member of the wheel, or may be of the demountable type.

15 represents an air conduit which is a curved metal tube, preferably square in cross section, its length and curvature being such that it has an internal diameter substantially coextensive with the external diameter of the portion of the rim 12, exposed between the base portions of the shoe, the square form being preferred because it provides a wide bearing of the conduit on the rim.

The air conduit 15 is adapted to be expanded to pass over the rim flanges, and contracted to bear on the rim between the flanges. To this end I make the conduit in the form of a non-continuous tubular ring, the continuity of which is interrupted at 15$^a$, so that the ring-shaped or annular conduit may be expanded and contracted to vary its internal diameter, the conduit being resilient and adapted to normally contract into close contact with the rim.

The ends of the conduit are closed by heads 16. 17 represents an inflating valve detachably secured to the conduit by suitable means such as a screw-threaded inner nipple 18, which is fixed to the conduit and projects therefrom through an opening 19 in the rim. Said opening may be the opening ordinarily provided for the inflating valve of an ordinary continuous inner tube. As here shown, the inflating valve 17 has a lateral nipple 20, to which an air supply tube, connected with an air pump tube may be coupled, said nipple being provided with a spring-closed valve 21.

The conduit 15 is provided with a plurality of outer nipples 22, each having a valve seat 23 on which a valve 24 is normally closed by a spring 25. A stem 26 fixed to the valve projects through the nipple and into the air conduit 15. To each nipple is securely coupled an inflatable bag 27, preferably of the quality of flexible rubber employed for making ordinary inner tubes, and provided with a neck 28 secured to the nipple to form an air-tight connection therewith, the neck being preferably bound upon the nipple by a suitable clamp 29. The number, form and proportions of the bags 27 are such that when the bags are inflated, they collectively fill the shoe 13, and form a cellular or sectional air cushion. When the valves 24 are opened the bags may be inflated simultaneously by air pumped through the inflating valve into the conduit 15, the air entering the bags through the nipples 22. To open the valves simultaneously I provide a valve-opening means, preferably embodied in an elongated flexible pull member 30, which is preferably a length of wire extending through practically the entire length of the conduit 15, and a plurality of enlargements 31, fixed to the member 30 and spaced apart thereon, the spacing of the enlargements and of the valve nipples 22 being alike. Each enlargement 31 is preferably a collar surrounding the member 30, and provided with a head or runner 32 in sliding contact with the conduit 15. The collar has a tapering portion which is formed and arranged to act as a cam in raising a valve stem 26 and opening a valve 24 when the member 30 and cams 31 are moved a short distance to the right from the position shown by Figure 3. The cams are inoperative when in this position.

A spring 34 secured at one end to a fixed support such as one of the heads 16, and at the opposite end to one end of the member 30, normally holds the cams 31 in an inoperative position. The spring is put under increased tension when force is exerted on the pull member 30 to move the cams 31 in the direction required to cause the opening of the valves 24, and acts to return the pull member and cams to an inoperative position when the force is no longer exerted.

The end of the member 30 opposite that connected with the spring 34 is extended outward through the inner nipple 18, and is coupled within the inflating valve 17 to an extension 36, which forms a part of the pull member, and extends through, and is movable in a stuffing-box 37, carried by one end of the inflating valve, said stuffing-box preventing leakage of air around the pull member. A handle 38 is secured to the extension 36, at a point outside the inflating valve, and is normally held by the tension of the spring 34 against the stuffing-box 37. When a pull is exerted on the handle 38 in the direction of the arrow (Figure 4), the member 30 and cams 31 are moved endwise to open the valves 24. The stuffing-box and the handle 38 limit the movement of the pull member and the cams to their inoperative position. The handle 38 is preferably adjustable on the extension 36, by means of a screw-thread connection therewith, to such an extent that the handle may confine the pull member and the cams in position to hold the valves open when the handle is released by the operator. In other words, when the handle is pulled outward far enough to open the valves, and while it is thus held by the operator, it may be screwed inward on the rod until it bears on the stuffing-box and retains the cams in their valve opening position, so that the operator may release the handle without permitting the valves to close, the handle constituting an adjustable stop.

When the handle is screwed to a suitable extent in the opposite direction, the valves are allowed to close.

When the inflating valve 17 is removed from the nipple 18, and the shoe is removed from the wheel rim, the air conduit 15 may be expanded, passed across one of the flanges of the rim, and allowed to contract upon the rim, the nipple 18 being in position to enter the rim orifice 19, and be engaged with the inflating valve. The bags 27 being deflated, the shoe may now be applied to the rim, the collapsed bags offering no considerable impediment, and being located within the shoe by the operation of applying the shoe to the rim. After this the bags may be inflated by opening the valves 24 and pumping air through the inflating valve, the valves 24 being then allowed to close.

The nipples 22 may be formed internally in any suitable way to cooperate with the valve stems 26, in forming air ducts through the nipples when the valves 24 are opened. Figure 1 shows a valve stem 26 which is polygonal in cross section, and passes loosely through the circular bore of the nipple. Figure 6 shows the valve stem provided with a grooved or fluted nut or collar, adapted to slide in contact with the bore of the nipple and permit the passage of air through the nipple.

The runners 32 present bearing surfaces adapted to move with but little frictional resistance on the inner surfaces of the conduit 15. The runners maintain the pull member 30 out of contact with the internal surface of the conduit 15, so that the only frictional resistance to the movement of the pull member is that caused by the bearing of the runners on said surface, said bearing being limited. The polygonal form of the conduit and the circular form of the runners 32 enables air to pass freely through the conduit across the runners.

It is obvious that air pressure caused by pumping air into the conduit 15, may force the valves 24 open and inflate the bags while the cams 31 are out of engagement with the valve stems, and that an ordinary air pump connection may be engaged with the inner nipple 18, while a loop at the outer end of the pull member 30 is seated on the outer end of the nipple, as shown by Figure 3. It is also obvious that when said pump connection is removed, the pull member may be actuated to open the valves and cause the deflation of the bags 27 by an outward pull exerted on said loop.

I claim:

1. A pneumatic element for the purpose stated, comprising a non-continuous annular air conduit, adapted to be expanded and contracted and to bear, when contracted, on a wheel rim between the base portions of a tire shoe, said conduit having an inner nipple, formed to project through the wheel rim, and a plurality of valved outer nipples arranged to stand between the base portions of the shoe, and provided with normally closed valves having stems projecting into the air conduit, independent inflatable bags coupled to said outer nipples, a flexible elongated pull member extending longitudinally within the conduit and through said inner nipple, a plurality of cams fixed to said member and arranged to simultaneously engage the valve stems and open the valves, and a spring within the air conduit acting on the pull member to normally hold the cams out of engagement with the valve stems, one end of the pull member being extended through and from the inner nipple, and adapted to be pulled outwardly, against the force of the spring to cause the engagement of the cams with the valve stems.

2. A pneumatic element for the purpose stated, comprising a non-continuous annular air conduit, adapted to be expanded and contracted and to bear, when contracted, on a wheel rim between the base portions of a tire shoe, said conduit having an inner nipple, formed to project through the wheel rim, and a plurality of valved outer nipples arranged to stand between the base portions of the shoe, and provided with normally closed valves having stems projecting into the air conduit, independent inflatable bags coupled to said outer nipples, a flexible elongated pull member extending longitudinally within the conduit and through said inner nipple, a plurality of cams fixed to said member and arranged to simultaneously engage the valve stems and open the valves, a spring within the air conduit acting on the pull member to normally hold the cams out of engagement with the valve stems, one end of the pull member being extended through and from the inner nipple and adapted to be pulled outwardly to cause the engagement of the cams with the valve stems, and means outside the inner nipple for confining the pull member against the force of the spring with the cams in engagement with the valve stems.

3. A pneumatic element for the purpose stated, comprising a non-continuous annular air conduit, adapted to be expanded and contracted and to bear, when contracted, on a wheel rim between the base portions of the tire shoe, said conduit having an inner nipple, formed to project through the wheel rim, and a plurality of valved outer nipples arranged to stand between the base portions of the shoe, and provided with normally closed valves having stems projecting into the air conduit, independent inflatable bags coupled to said outer nipples, a flexible elongated pull member extending longitudinally within the conduit and through said inner nipple, a plurality of cams fixed to said member and arranged to simultaneously engage the valve stems and open the valves, a spring within the air conduit acting on the pull member to normally hold the cams out of engagement with the valve stems, an inflating valve coupled to the inner nipple, one end of the pull member being extended through and from the inner nipple and the inflating valve and adapted to be pulled outwardly to cause the engagement of the cams with the valve stems, and an adjustable stop on the extended portion of the pull member cooperating with the inflating valve in confining the pull member against the force of the spring with the cams in engagement with the valve stems.

4. A pneumatic element for the purpose stated, comprising a non-continuous annular air conduit, adapted to be expanded and contracted and to bear, when contracted, on a wheel rim between the base portions of a tire shoe, said conduit having an inner nipple, formed to project through the wheel rim, and a plurality of valved outer nipples arranged to stand between the base portions of the shoe, and provided with normally closed valves having stems projecting into the air conduit, independent inflatable bags coupled to said outer nipples, a flexible elongated pull member extending longitudinally within the conduit and through said inner nipple, a plurality of cams fixed to said member and arranged to simultaneously engage the valve stems and open the valves, and a spring within the air conduit acting on the pull member to normally hold the cams out of engagement with the valve stems, one end of the pull member being extended through and from the inner nipple, and adapted to be pulled outwardly, against the force of the spring to cause the engagement of the cams with the valve stems, the said cams being provided with runners maintaining the pull member out of contact with the internal surface of the conduit and having a limited bearing on said surface.

5. A pneumatic element for the purpose stated, comprising a non-continuous annular air conduit, adapted to be expanded and contracted, and to bear, when contracted, on a wheel rim between the base portions of a tire shoe, said conduit having an inner nipple adapted to project through the wheel rim and engage an inflating valve, and a plurality of valved outer nipples arranged to stand between the base portions of the shoe, the valves of said nipples being normally closed to prevent the passage of air through the nipples, a plurality of independent inflatable bags coupled to said outer nipples, and supported thereby in position to occupy the interior of the shoe, the said valves being provided with stems projecting into the air conduit, an inflating valve detachably secured to said inner nipple, and having a stuffing-box, a flexible elongated pull member within said conduit, a plurality of cams fixed to said member, and arranged to simultaneously displace the valve stems and open the valves, said cams having runners in sliding contact with the conduit, and a spring acting on the pull member to normally hold the cams out of engagement with the valve stems, one end of the pull member extending through the stuffing-box of the inflating valve and having a handle normally held by said spring against the stuffing-box.

6. A pneumatic element substantially as specified by claim 5, the handle being adjustable on the pull member and constituting a stop adapted to hold the pull member and cams in their valve-opening position.

In testimony whereof I have affixed my signature.

SILVIO AMOROSO.